US010972456B2

(12) United States Patent
Vasters et al.

(10) Patent No.: US 10,972,456 B2
(45) Date of Patent: Apr. 6, 2021

(54) IOT DEVICE AUTHENTICATION

(71) Applicant: Microsoft Technology Licensing, LLC, Redmond, WA (US)

(72) Inventors: Clemens Vasters, Viersen (DE); Arjmand Samuel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/344,451

(22) Filed: Nov. 4, 2016

(65) Prior Publication Data
US 2018/0131689 A1 May 10, 2018

(51) Int. Cl.
| G06F 21/00 | (2013.01) |
| H04L 29/06 | (2006.01) |
| H04W 12/06 | (2021.01) |
| H04L 12/66 | (2006.01) |
| H04L 12/28 | (2006.01) |
| H04L 29/08 | (2006.01) |
| H04W 4/70 | (2018.01) |

(52) U.S. Cl.
CPC ...... *H04L 63/0853* (2013.01); *H04L 12/2803* (2013.01); *H04L 12/66* (2013.01); *H04L 63/0861* (2013.01); *H04L 63/0876* (2013.01); *H04W 12/06* (2013.01); *H04L 67/12* (2013.01); *H04W 4/70* (2018.02)

(58) Field of Classification Search
CPC .................................................. H04L 63/0853
USPC ............................................................. 726/3
See application file for complete search history.

(56) References Cited

U.S. PATENT DOCUMENTS

| 6,775,780 B1 | 8/2004 | Muttik |
| 7,991,902 B2 | 8/2011 | Cross et al. |
| 8,038,213 B2 | 10/2011 | Owens |
| (Continued) | | |

FOREIGN PATENT DOCUMENTS

| CN | 103442353 A | 12/2013 |
| CN | 103701857 A | 4/2014 |
| (Continued) | | |

OTHER PUBLICATIONS

"IoT and M2M Data Analytics", http://www.aeris.com/technology/aervoyance/, Published on: Aug. 15, 2015, 5 pages.
(Continued)

*Primary Examiner* — Harris C Wang
(74) *Attorney, Agent, or Firm* — Davin Chin; Chin IP, PLLC

(57) ABSTRACT

The disclosed technology is generally directed to device authentication in an IoT environment. For example, such technology is usable in authenticating IoT devices to an IoT Hub. In one example of the technology, data field targets are received for an IoT device. The data field targets may include at least one device identity data field target and at least one telemetry data field target. Data field entries are received from the IoT device at a first time. The data field entries may include at least one device identity data field entry and at least one telemetry data field entry. A determination is made as to whether the data field entries match the corresponding data field targets for the IoT device. The IoT device is selectively allowed to connect to the IoT hub based on the determination.

20 Claims, 5 Drawing Sheets

(56) References Cited

U.S. PATENT DOCUMENTS

| | | | |
|---|---|---|---|
| 8,810,430 | B2 | 8/2014 | Proud |
| 8,988,350 | B2 | 3/2015 | Karmarkar et al. |
| 9,094,448 | B2 | 7/2015 | Benefield |
| 9,264,436 | B2 | 2/2016 | Canning et al. |
| 9,268,938 | B1 | 2/2016 | Aguayo Gonzalez et al. |
| 9,384,075 | B2 | 7/2016 | Kim |
| 9,478,132 | B1 | 10/2016 | Dai |
| 9,514,296 | B2 | 12/2016 | Kim et al. |
| 10,291,477 | B1* | 5/2019 | Askar ............ H04W 4/50 |
| 10,530,749 | B1 | 1/2020 | Park et al. |
| 2006/0229931 | A1 | 10/2006 | Fligler et al. |
| 2008/0022404 | A1 | 1/2008 | Holtmanns et al. |
| 2010/0235917 | A1 | 9/2010 | Ku et al. |
| 2012/0083974 | A1 | 4/2012 | Sandblom |
| 2013/0060400 | A1 | 3/2013 | Hahne |
| 2013/0160088 | A1 | 6/2013 | Mcfarland |
| 2013/0173064 | A1 | 7/2013 | Fadell et al. |
| 2013/0346596 | A1 | 12/2013 | Balakrishnan et al. |
| 2014/0149806 | A1 | 5/2014 | Khalastchi et al. |
| 2014/0196131 | A1 | 7/2014 | Lee |
| 2014/0266669 | A1 | 9/2014 | Fadell et al. |
| 2015/0019553 | A1 | 1/2015 | Shaashua et al. |
| 2015/0019710 | A1 | 1/2015 | Shaashua et al. |
| 2015/0058914 | A1 | 2/2015 | Yadav |
| 2015/0134954 | A1* | 5/2015 | Walley ........... H04L 63/0823 713/168 |
| 2015/0149310 | A1 | 5/2015 | He et al. |
| 2015/0150124 | A1 | 5/2015 | Zhang et al. |
| 2015/0163121 | A1* | 6/2015 | Mahaffey ......... G06F 11/0709 707/687 |
| 2015/0271003 | A1 | 9/2015 | Kuchi et al. |
| 2015/0271033 | A1 | 9/2015 | Srivastava et al. |
| 2015/0350844 | A1 | 12/2015 | Agarwal et al. |
| 2016/0026729 | A1 | 1/2016 | Gil et al. |
| 2016/0048683 | A1 | 2/2016 | Sanders et al. |
| 2016/0063210 | A1 | 3/2016 | Bardi et al. |
| 2016/0127392 | A1 | 5/2016 | Baxley et al. |
| 2016/0139575 | A1 | 5/2016 | Funes |
| 2016/0150350 | A1 | 5/2016 | Ingale et al. |
| 2016/0173495 | A1 | 6/2016 | Joo |
| 2016/0189450 | A1 | 6/2016 | Anderson et al. |
| 2016/0197798 | A1 | 7/2016 | Britt et al. |
| 2016/0197916 | A1 | 7/2016 | Ravindran et al. |
| 2016/0198536 | A1* | 7/2016 | Britt ............ H05B 47/19 315/149 |
| 2016/0212099 | A1* | 7/2016 | Zou ............ H04L 63/0263 |
| 2016/0232159 | A1 | 8/2016 | Parikh |
| 2016/0259043 | A1 | 9/2016 | Schar |
| 2016/0261465 | A1 | 9/2016 | Gupta et al. |
| 2016/0267408 | A1 | 9/2016 | Singh et al. |
| 2016/0295010 | A1 | 10/2016 | Miller |
| 2016/0301707 | A1 | 10/2016 | Cheng et al. |
| 2016/0315929 | A1* | 10/2016 | Childress ......... H04L 63/0853 |
| 2016/0323257 | A1 | 11/2016 | Kang et al. |
| 2016/0323283 | A1* | 11/2016 | Kang ............ H04L 63/08 |
| 2016/0343225 | A1 | 11/2016 | Lee |
| 2016/0352685 | A1 | 12/2016 | Park |
| 2016/0358184 | A1 | 12/2016 | Radocchia et al. |
| 2016/0366102 | A1 | 12/2016 | Smith |
| 2016/0380856 | A1 | 12/2016 | Ben Hamida et al. |
| 2016/0381030 | A1 | 12/2016 | Chillappa et al. |
| 2017/0005874 | A1 | 1/2017 | Banerjee et al. |
| 2017/0024290 | A1 | 1/2017 | Kaulgud et al. |
| 2017/0060911 | A1* | 3/2017 | Loscalzo ............ G06F 16/258 |
| 2017/0063798 | A1* | 3/2017 | Lapidous ........... H04L 63/0272 |
| 2017/0090007 | A1 | 3/2017 | Park et al. |
| 2017/0099353 | A1* | 4/2017 | Arora ............ H04L 67/12 |
| 2017/0180357 | A1* | 6/2017 | Ghosh ............ H04W 4/70 |
| 2017/0217433 | A1 | 8/2017 | Halder et al. |
| 2017/0235783 | A1* | 8/2017 | Chen ............ H04W 4/70 707/691 |
| 2017/0359417 | A1* | 12/2017 | Chen ............ H04L 67/12 |
| 2017/0373855 | A1* | 12/2017 | Pritchard ........... H04L 67/12 |
| 2018/0096439 | A1 | 4/2018 | Davies et al. |
| 2018/0129805 | A1* | 5/2018 | Samuel ............ H04L 63/1425 |
| 2018/0131689 | A1* | 5/2018 | Vasters ............ H04L 63/0876 |
| 2020/0104484 | A1 | 4/2020 | Samuel |

FOREIGN PATENT DOCUMENTS

| | | |
|---|---|---|
| CN | 103812869 A | 5/2014 |
| CN | 104243406 A | 12/2014 |
| WO | 2015200511 A1 | 12/2015 |
| WO | 2016140912 A1 | 9/2016 |
| WO | 2016187298 A1 | 11/2016 |
| WO | 2017189361 A1 | 11/2017 |

OTHER PUBLICATIONS

"IBM Security QRadar SIEM", http://www-03.ibm.com/software/products/en/qradar-siem, Retrieved on: Oct. 21, 2016, 2 pages.

"FortiGuard Labs Researchers Predict That IoT Attacks and New Evasion Techniques Will Characterize Emerging Threats in 2016", https://www.fortinet.com/corporate/about-us/news-events/press-releases/2015/fortiguard-labs-predict-2016-iot-attacks-evasion-techniques.html, Published on: Nov. 24, 2015, 5 pages.

"International Search Report and Written Opinion Issued in PCT Application No. PCT/US2017/058924", dated Jan. 17, 2018, 12 Pages.

"Mobile Access—Secure Access Control Solutions—HID Global", https://www.hidglobal.com/solutions/mobile-access, Retrieved on: Jan. 30, 2017, 7 pages.

"International Search Report and Written Opinion Issued in PCT Application No. PCT/US2017/058926", dated Dec. 18, 2017, 12 Pages.

Blowers, et al., "The Future Internet of Things and Security of its Control Systems", In Journal of the Computing Research Repository, Oct. 2016, 29 pages.

Diez, et al., "Toward self-authenticable wearable devices", In Journal of IEEE Wireless Communications, vol. 22, Issue 1, Feb. 2015, pp. 36-43.

Neisse, et al., "SecKit: A Model-based Security Toolkit for the Internet of Things", In Journal of Computers & Security, vol. 54, Oct. 2015, 60-76 pages.

Reineh, et al., "Trustworthy and Secure Service-Oriented Architecture for the Internet of Things", In Journal of Computing Research Repositorys, Jun. 6, 2016, 2 pages.

Samuel, Arjmand; "IoT Security Service"; U.S. Appl. No. 15/344,461, filed Nov. 4, 2016; 27 pages.

Taneja, Mukesh, "An analytics framework to detect compromised IoT devices using mobility behavior", In Proceedings of IEEE International Conference on ICT Convergence, Oct. 14, 2013, pp. 38-43.

Vasters, Clemens et al.; "Behavior-Based Data Corroboration"; U.S. Appl. No. 15/436,194, filed Feb. 17, 2017; 30 pages.

Vasters, Clemens et al.; "Plausibility-Based Authorization"; U.S. Appl. No. 15/458,916, filed Mar. 14, 2017; 28 pages.

Vasters, Clemens et al.; "Security Rules Including Pattern Matching for IoT Devices"; U.S. Appl. No. 15/436,107, filed Feb. 17, 2017; 32 pages.

"Non Final Office Action Issued in U.S. Appl. No. 15/344,461", dated Aug. 2, 2018, 15 Pages.

"Non Final Office Action Issued in U.S. Appl. No. 15/436,107", dated Mar. 14, 2019, 28 Pages.

"Final Office Action Issued in U.S. Appl. No. 15/344,461", dated Feb. 8, 2019, 13 Pages.

"Non Final Office Action Issued in U.S. Appl. No. 15/344,461", dated Apr. 30, 2019, 15 Pages.

"Final Office Action Issued in U.S. Appl. No. 15/436,107", dated Jun. 3, 2019, 26 Pages.

"Notice of Allowance Issued in U.S. Appl. No. 15/344,461", dated Aug. 26, 2019, 9 Pages.

"Non Final Office Action Issued in U.S. Appl. No. 15/458,916", dated Oct. 7, 2019, 24 Pages.

"Non Final Office Action Issued in U.S. Appl. No. 15/436,194", dated Oct. 7, 2019, 27 Pages.

(56) References Cited

OTHER PUBLICATIONS

"Non Final Office Action Issued in U.S. Appl. No. 15/436,107", dated Oct. 31, 2019, 31 Pages.
"Final Office Action Issued in U.S. Appl. No. 15/436,107", dated Feb. 20, 2020, 24 Pages.
"Final Office Action Issued in U.S. Appl. No. 15/436,194", dated Feb. 20, 2020, 33 Pages.
"Final Office Action Issued in U.S. Appl. No. 15/458,916", dated Feb. 13, 2020, 27 Pages.
"Non-Final Office Action Issued in U.S. Appl. No. 15/458,916", dated May 7, 2020, 22 Pages.
"Office Action Issued in Chilean Patent Application No. 201901126", dated May 14, 2020, 12 Pages.
"Office Action Issued in European Patent Application No. 17797814.5", dated Apr. 6, 2020, 6 Pages.
"Non Final Office Action Issued in U.S. Appl. No. 15/436,194", dated Jul. 6, 2020, 27 Pages.
"Office Action and Search Report Issued in Colombia Patent Application No. NC2019/0004599", dated Jun. 18, 2020, 20 Pages.
"Non Final Office Action Issued in U.S. Appl. No. 15/436,107", dated Aug. 26, 2020, 51 Pages.
"Final Office Action Issued in U.S. Appl. No. 15/458,916", dated Sep. 23, 2020, 26 Pages.
"Final Office Action Issued in U.S. Appl. No. 15/436,194", dated Nov. 3, 2020, 31 Pages.
"Office Action Issued in Israel Patent Application No. 2643052", dated Dec. 1, 2020, 6 Pages.
"Final Office Action Issued in U.S. Appl. No. 15/436,107", dated Jan. 29, 2021, 33 Pages.
"Office Action and Search Report Issued in Colombia Patent Application No. NC2019/0004599", dated Jan. 25, 2021, 20 Pages.
"Office Action Issued in European Patent Application No. 17798049.7", dated Feb. 3, 2021, 5 Pages.
"First Office Action and Search Report Issued in Chinese Patent Application No. 20170068009.8", dated Jan. 28, 2021, 15 Pages, \* cited by examiner

IOT DEVICE AUTHENTICATION

BACKGROUND

The Internet of Things ("IoT") generally refers to a system of devices capable of communicating over a network including the communications of data over the network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to device authentication in an IoT environment. For example, such technology is usable in authenticating IoT devices to an IoT Hub. In one example of the technology, data field targets are received for an IoT device. The data field targets may include at least one device identity data field target and at least one telemetry data field target. Data field entries are received from the IoT device at a first time. The data field entries may include at least one device identity data field entry and at least one telemetry data field entry. A determination is made as to whether the data field entries match the corresponding data field targets for the IoT device. The IoT device is selectively allowed to connect to the IoT hub based on the determination.

Examples of the disclosure allow an IoT device based to be identified based on the data that the IoT device generates due to the IoT device being deployed in a physical environment. The identifying data for the IoT device may be of different types. Multiple types of data being generated by the IoT device may be aggregated to create stronger identity. Some of this data may be generated as part of the IoT device's regular operation, and some may be specially generated for use in identifying the IoT device. In this way, a unique identity may be provided to each of a large number of IoT devices so that the IoT devices can be addressed securely, uniquely, in a scalable manner.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
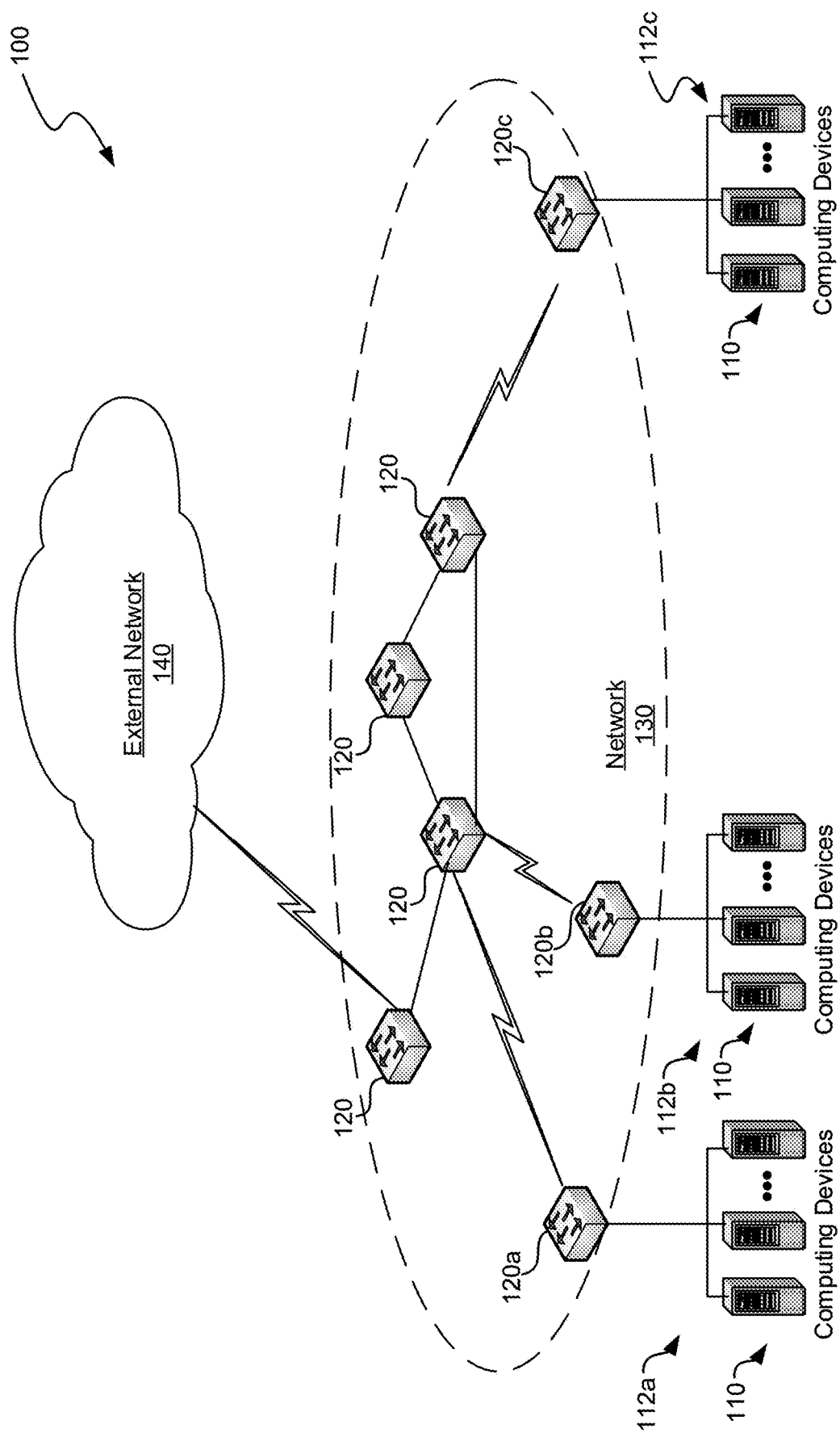
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "IoT hub" is not limited to one particular type of IoT service, but refers to the device to which the IoT device communicates, after provisioning, for at least one IoT solution or IoT service. That is, the term "IoT hub," as used throughout the specification and the claims, is generic to any IoT solution.

Briefly stated, the disclosed technology is generally directed to device authentication in an IoT environment. For example, such technology is usable in authenticating IoT devices to an IoT Hub. In one example of the technology, data field targets are received for an IoT device (i.e., associated with an IoT device). The data field targets may include at least one device identity data field target and at least one telemetry data field target. Data field entries are received from the IoT device at a first time. The data field entries may include at least one device identity data field entry and at least one telemetry data field entry. A determination is made as to whether the data field entries match the corresponding data field targets for the IoT device. The IoT device is selectively allowed to connect to the IoT hub based on the determination.

IoT devices tend to be small, low power, low cost, and numerous. It is typically not simple to provide a unique identity to a large number of IoT devices so that the IoT devices can be addressed securely and uniquely. IoT devices are typically small and often may not be very accessible, and so authentication via entry of a password through a keyboard or the like is not generally possible, inconvenient, or impractical. Also, when a device is manufactured, it is often not known how and where the device will ultimately be deployed.

Examples of the disclosure allow an IoT device based to be identified based on the data that the IoT device generates due to the IoT device being deployed in a physical environment. The identifying data for the IoT device may be of different types. Multiple types of data being generated by the IoT device may be aggregated to create stronger identity. Some of this data may be generated as part of the IoT device's regular operation, and some may be specially generated for use in identifying the IoT device. Data may include, among other things, an identity such as a serial number or other form of identity, and may include telemetry data such as temperature, humidity, light data, location data, or the like. If the data does not match the identity, connection of the IoT device to the IoT hub may be disallowed until and/or unless the IoT device is verified, for example by the device holder via a device portal.

In this way, a unique identity may be provided to each of a large number of IoT devices to that the IoT devices can be addressed securely, uniquely, in a scalable manner. In some embodiments, this technology may be employed to authenticate IoT devices without a secure storage mechanism such as a trusted platform module (TPM).

Examples of the disclosure may allow any IoT device with known data output to be identified by a profile of the data. In some examples, device identity may be made stronger by aggregating multiple data streams from the IoT device. For more critical devices, additional hardware may be added to enable even stronger identities. Examples of the disclosure allow scaled deployment of IoT devices without relying on having symmetric or asymmetric keys on the IoT device. In some examples, the security stance of the IoT device can be adapted depending on the deployment scenario and the criticality of the IoT device.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general—or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a manufacturer device, a deployer device, a device that comprises part or all of an IoT hub, a device comprising part or all of a device portal service, or the like, as discussed in greater detail below.

Illustrative Computing Device

Figure 2:
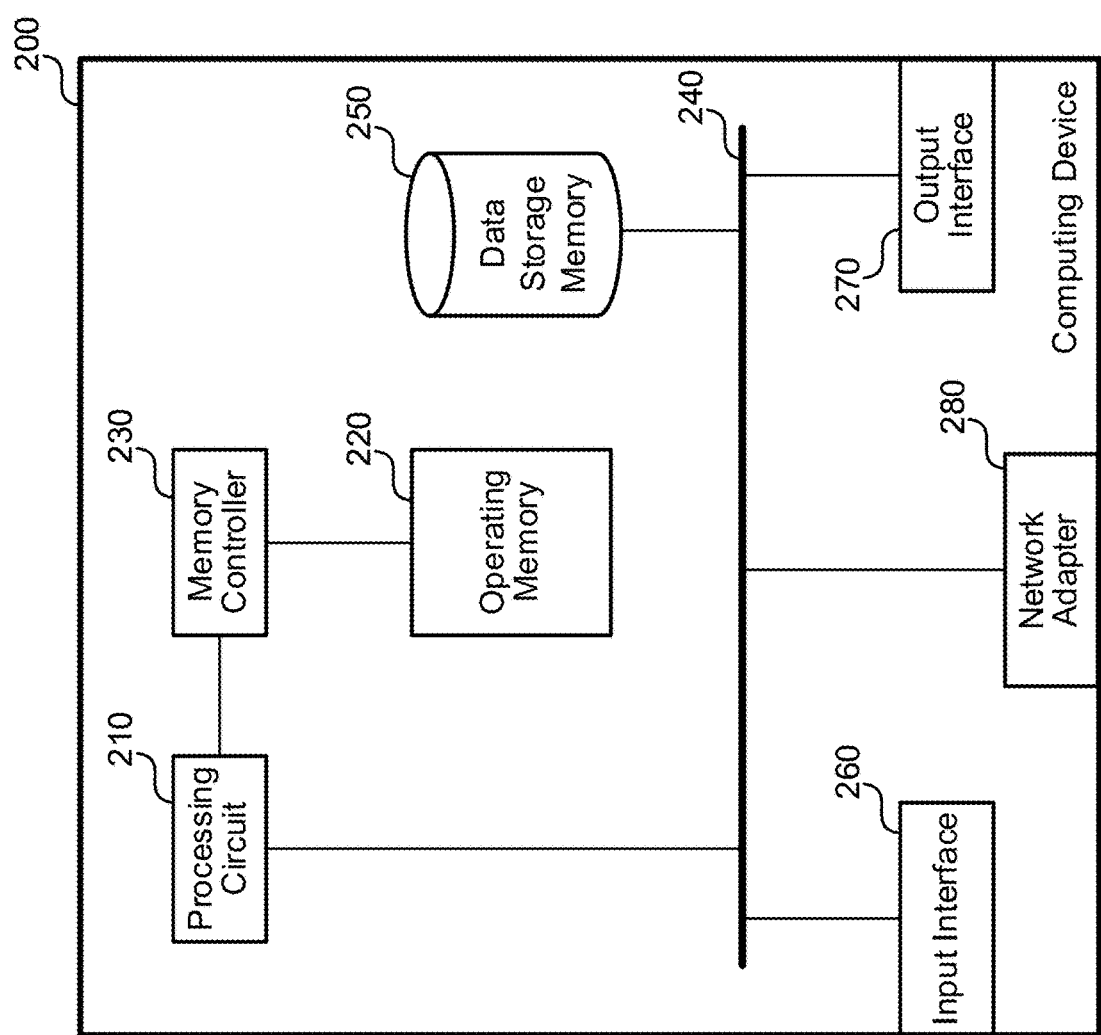
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general—or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions. In some examples, computing device 200 is enabled to perform actions such as the actions in the process of FIG. 4 or FIG.

5 below, or actions in a process performed by one or more of the computing devices in FIG. 3 below.

Illustrative System

Figure 3:
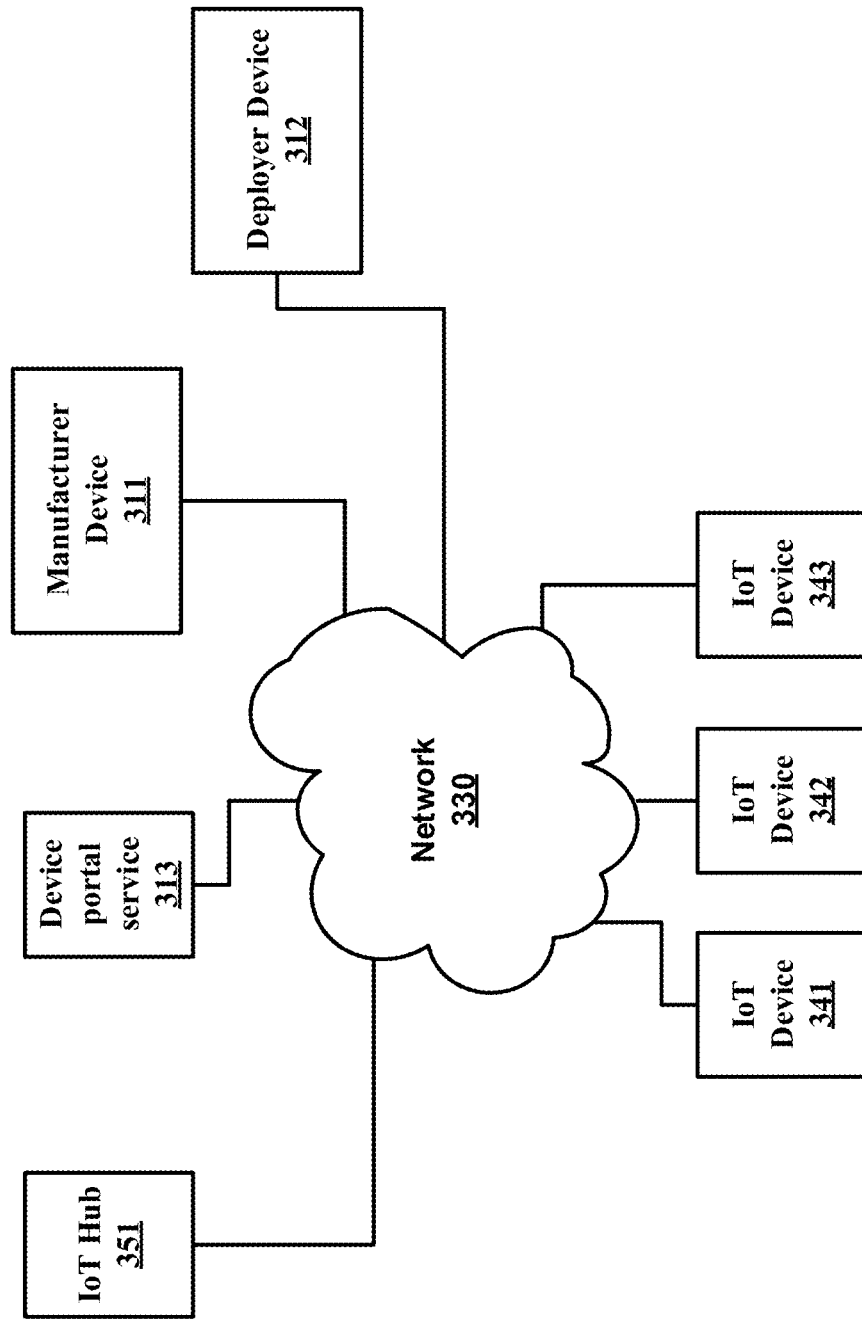
FIG. 3 is a block diagram illustrating an example of a system for IoT authentication.

FIG. 3 is a block diagram illustrating an example of a system (300) for IoT communications. System 300 may include network 330, IoT hub 351, IoT devices 341-343, manufacturer device 311, deployer device 312, and device portal service 313, which all connect to network 330. The term "IoT device" refers to a device that makes use of, or is intended to make use of, IoT services. An IoT device can include virtually any device that connects to the cloud to use IoT services, including for telemetry collection or any other purpose. Device portal service 313 includes one or more devices that provide a device portal. The term "IoT hub" refers to a device, or multiple devices such as a distributed system, to which IoT devices connect on the network for IoT services.

Each of the IoT devices 341-343, manufacturer device 311, deployer device 312, and/or the devices that comprise IoT hub 351 and/or device portal service 313 may include examples of computing device 200 of FIG. 2. As previously discussed, the term "IoT hub" is not limited to one particular type of IoT service, but refers to the device to which the IoT device communicates, after provisioning, for at least one IoT solution or IoT service. That is, the term "IoT hub," as used throughout the specification and the claims, is generic to any IoT solution. FIG. 3 and the corresponding description of FIG. 3 in the specification illustrates an example system for illustrative purposes that does not limit the scope of the disclosure.

Network 330 may include one or more computer networks, including wired and/or wireless networks, where each network maybe, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT hub 351, IoT devices 341-343, manufacturer device 311, deployer device 312, and device portal service 313.

As one example, IoT devices 341-343 are devices that are intended to make use of IoT services provided by one or more IoT hubs, such as IoT hub 351. Device portal service 313 includes a device or multiple devices that perform actions in providing a device portal to users of IoT devices. Manufacturer device 311 and deployer device 312 are computing devices used by a manufacturer and a deployer, respectively.

Manufacturer device 311 is a device used for functions including network communications by a manufacturer of IoT devices including IoT device 341. Deployer device 312 is a device used for functions including network communications by a deployer of IoT devices including IoT device 341. Device portal service 313 is a service which may be used by users of IoT devices to manage IoT services for IoT devices including IoT device 341.

System 300 may include more or less devices than illustrated in FIG. 3, which is shown by way of example only.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4:
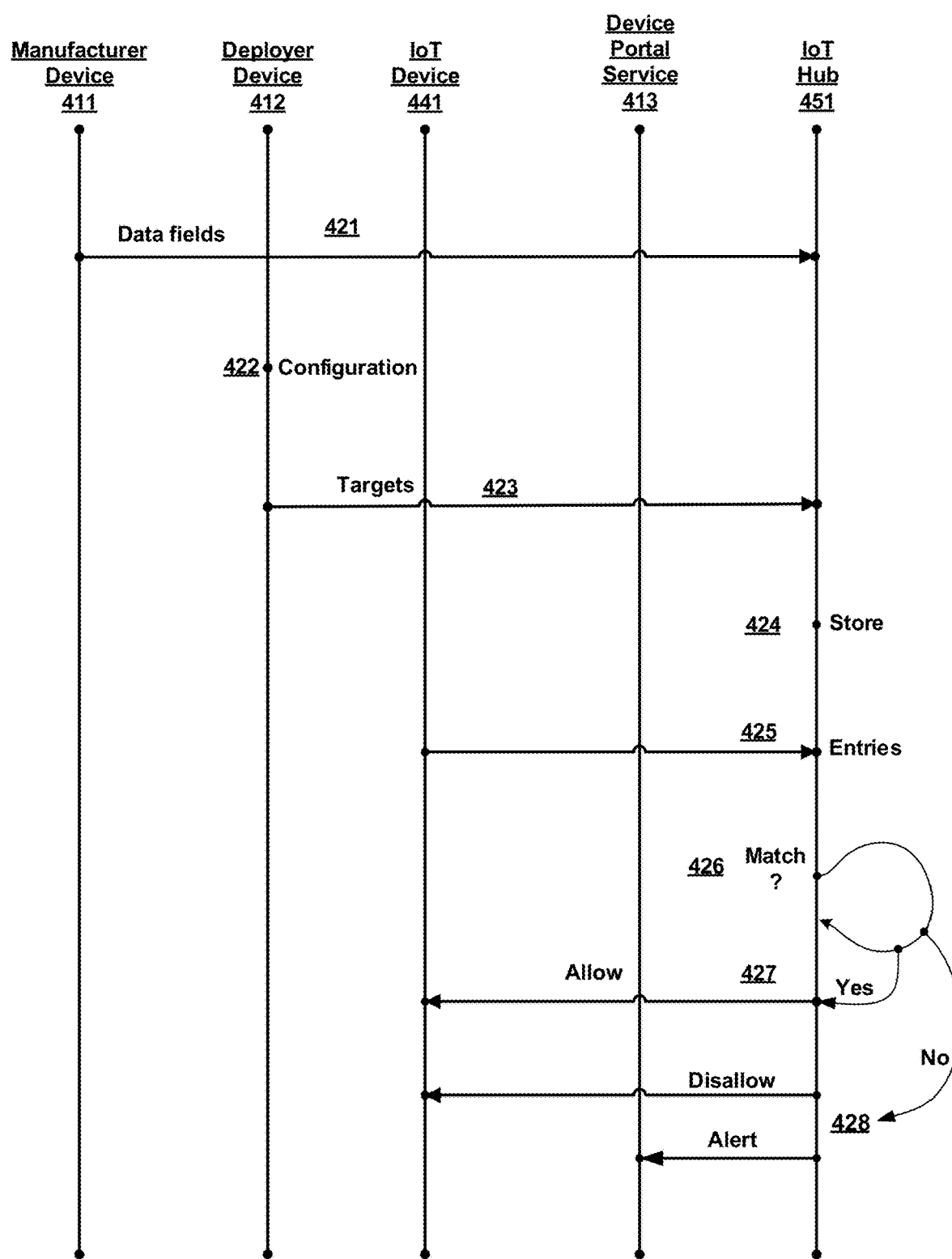
FIG. 4 is a diagram illustrating an example dataflow for a process for IoT authentication.

FIG. 4 is a diagram illustrating an example dataflow for a process (420) for IoT authentication. FIG. 4 and the corresponding description of FIG. 4 in the specification illustrate an example process for illustrative purposes that do not limit the scope of the disclosure.

In the illustrated example, first, step 421 occurs. At step 421, manufacturer device 411 communicates data field elements to IoT hub 451 for the class of IoT devices to which IoT device 441 belongs. "Class" of device here refers to the type of IoT devices—a few examples of classes of IoT devices include humidity sensors, motion sensors, fitness bands, toasters, coffee machines, thermostat systems, washers, dryers, lamps, automobiles, or any other suitable IoT device. In some examples, manufacturer device 411 communicates the type of data fields that the class of device to which IoT device 441 belongs will send, but not actual or expected values for the data fields. In other examples, manufacturer device 411 also sends expected values for the data fields.

In some examples, manufacturers are given information as to the way in which the data fields are to be provided, so that there is a schema in which the first thing provided by the manufacturer is the data fields.

As shown, step 422 occurs next in some examples. In step 422, deployer device 412 performs a configuration for IoT device 441 in some examples. In these examples, during the configuration, deployer device 412 determines data field targets for multiple data fields for IoT device 441. In various examples, the data field targets may be for a variety of different data field types including one or more identity data field targets, one or more telemetry data field targets, and/or the like. Identity data fields may include, for example, serial number. In various examples, an identity data field may be a user-defined device ID, a hardware-centric device ID, an ID based on measurement made on IoT device 441, such as an ID based on the entropy of the IoT device 441, a system-generated device ID, a device ID that is generated outside of the system, and/or the like.

Telemetry data fields may include, for example, temperature, humidity, location data, light data, heart rate, breathing rate, and/or the like. Some or all of the data field targets may be ranges, and some or all of the data field targets may be discrete values. In some examples, data field targets may be conditional, such as conditional on other data field targets or other data. For example, one temperature range may be the target at one time of day and another temperature range may be the target at another time of day. As another example, one humidity range may be the target at one location and another humidity range may be the target at another range.

As shown, step 423 occurs next in some examples. During step 423, the data field targets may be communicated from deployer device 412 to IoT hub 451. As shown, step 424 occurs next. At step 424, in some examples, the received data field targets are stored in IoT hub 451 in some examples. As shown, step 425 occurs next. At step 425, in some examples, data field entries are communicated from IoT device 441 to IoT hub 451. In some examples, step 425 occurs after IoT device 441 is switched on. In other examples, step 425 occurs at another suitable time.

As shown, step 426 occurs next. At step 426, IoT hub 451 makes a determination as to whether the data field entries received from IoT device 441 match the corresponding data field targets stored in IoT hub 451 for the first IoT device. If so, step 427 occurs, where IoT hub 451 allows IoT device 441 to connect to IoT hub 451. If not, step 428 occurs, where IoT hub does not allow IoT device 441 to connect to IoT hub 451, and IoT hub 451 communicates an alert to device portal 414.

Although not shown in FIG. 4, after step 428, the device holder (i.e., the user of the IoT device) may use device portal 413 to respond to the alert and update data, which in turn is communicated to IoT hub 451. In some examples in which the connection has been disallowed and alert sent, if the device holder wishes to allow the IoT device to connect, correct answers to security questions (by the device holder, via the device portal service) may be required. These steps may help ensure that the sensor was not moved, changed, tampered with, or the like in an unauthorized manner. By disallowing the connection upon the determination at step 426 is negative, the connection may be disabled before IoT device 441 can send out potentially unwanted data to IoT hub 451.

Although not shown in FIG. 4, the device holder may also use device portal 413 to re-configure the data field targets, so that one of more of the data field targets is changed. If so, in some examples, the updated data field targets are then communicated from device portal 413 to IoT hub 451, and then IoT hub 451 stores the updated values based on the re-configuration.

FIG. 4 shows an example in which the initial configuration is based on communication from deployer device 412. However, in other examples, the initial configuration can be accomplished in different manner, and may come from manufacturer device 411, device portal 413, or from another suitable source. Re-configuration can also happen in a variety of different manners in various examples.

In various examples, after the process is complete, the processor returns to step 425 at a later time, and the process occurs from steps 425 on again in order to authenticate IoT device 441 again at the later time.

In various examples, differing strengths of identity may be employed. An identity may be made stronger with increased requirements for authentication, including, for example, one or more of a requirement of more matching data field entries to match data field targets for identification, using narrower allowable ranges for some or more of the data field targets, or using discrete data field targets for some or more of the data field targets. The specific types of data fields required to match may also be a factor in the strength of the identity. Also, two or more of these factors may be used in combination in order to create a stronger identity.

The configuration defines targets for data field entries, and also includes requirements for which data field entries are required to match their target in order for the IoT device to be authenticated, along with, as discussed, either a range of allowable values or a specific discrete value that must be matched in order for the IoT device to be authenticated. Additionally, as previously discussed, in some examples, some matches may be contingent on other values, such as time of day, and/or other suitable values.

Strength of the identity may be selected by the configuring entity as part of the configuration, and context may be a factor. For examples, a particularly strong identity may be required for critical contexts and critical devices, such as for a nuclear plant. In general, the security stance of the device and the strength of the identity can be adapted depending on the deployment scenario and the criticality of the device.

In some examples, configuration can also be based on queries made to the user. A unique profile can be built for the user. For example, a user can receive queries as to the user's location most of the time or at certain times of the day, queries about environment and temperature, and/or the like. In other examples, the device collects data automatically to build the profile without querying the user, or through a combination of querying the user and collecting the data automatically.

In some examples, each of the network communications illustrated in FIG. 4 are secure network communications that may make use of encryptions and other techniques to ensure secure network communications.

In accordance with FIG. 3 and FIG. 4, IoT devices can be authenticated by a data profile. Examples use cases may be provided as follows.

In one example use case, an IoT device generates temperature, humidity, luminosity, and GPS parameters. This data may be collected in a cloud service and actions may be taken if any one parameter goes outside target values. The IoT device may be identified in the cloud service by a data envelop which includes a range of temperature, humidity, patterns of luminosity, and the location where it is deployed. Since for this specific type of IoT device, location is fixed, location becomes the primary identifying data stream in this example. The data envelop of temperature and other data streams add to the primary location data stream, and together these parameters form a relatively strong identity in this example. If the device is moved, or if the other data envelop is changed drastically, the device is no longer identified in the cloud in this example.

This scheme exhibits the following properties. The device identity may be made stronger by adding more parameters, or by constraining the data envelop of all data streams. Also, in this example, no special keying is required by the device, allowing scaled deployment.

In another example use case, a fitness band worn by a user emits heart rate and exercise patterns. The fitness band also generates location data signifying where the user goes as a part of his/her daily routine. The example fitness band is identified by the patterns of each of these data elements, including changing location. In this case the pattern of heart rate may be used as a string identifying data stream, and location pattern may be used as a secondary data stream.

Figure 5:
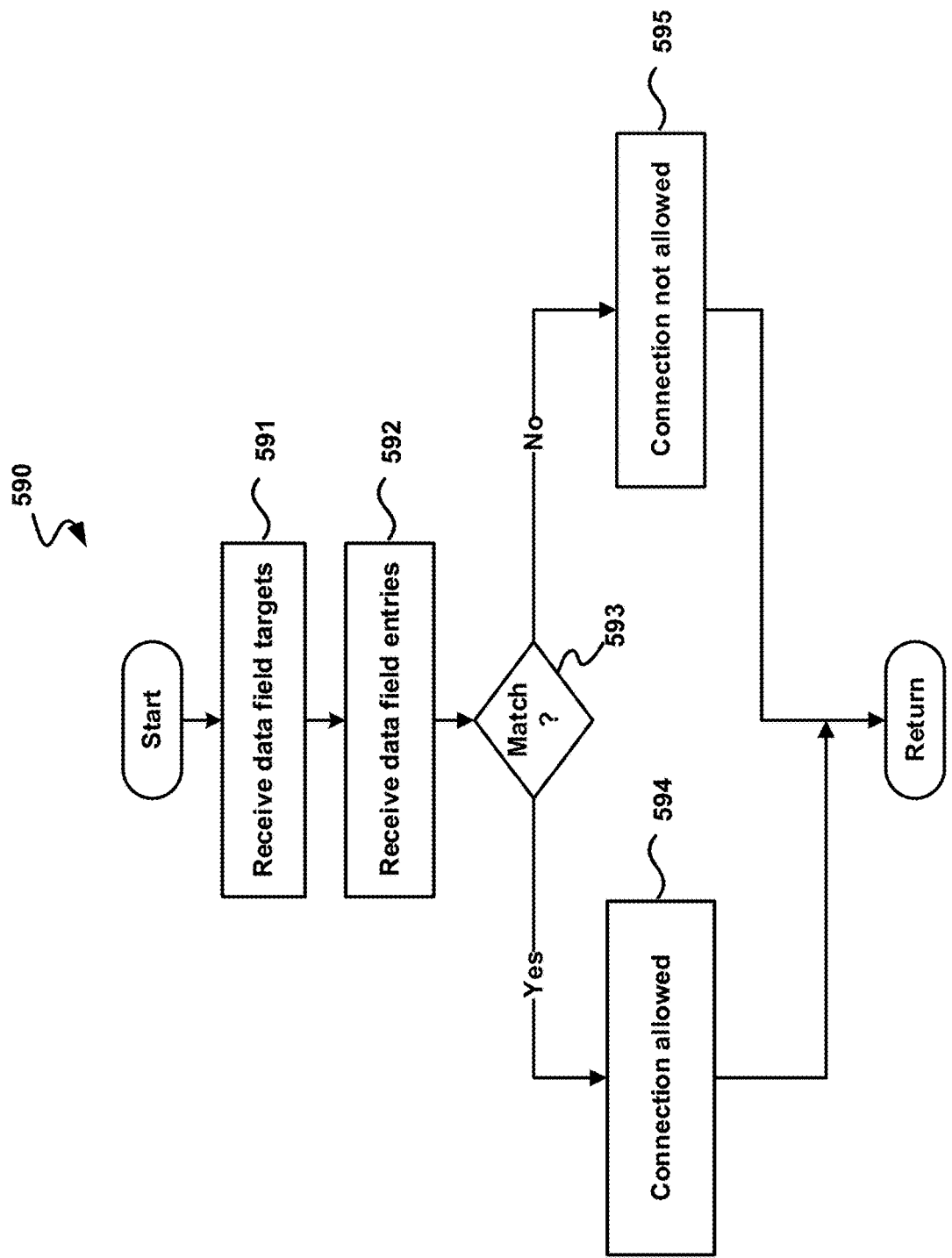
FIG. 5 is a logical flow diagram illustrating an example of a process for IoT authentication, in accordance with aspects of the present disclosure.

FIG. 5 is a logical flow diagram illustrating an example of a process (590) for IoT authentication. After a start block, the process proceeds to block 591. At block 591, a plurality of data field targets for a first IoT device is received. In some examples, the plurality of data field targets includes at least one device identity data field target and at least one telemetry data field target. The process then moves to block 592. At block 592, a first plurality of data field entries from the first IoT device at a first time may be received. In some examples, the first plurality of data field entries includes at least one device identity data field entry and at least one telemetry data field entry. The process then proceeds to decision block 593.

At decision block 593, a first determination is made. The first determination is a determination as to whether the first plurality of data field entries match the corresponding data field targets for the first IoT device. If the determination at decision block 593 is positive, the process proceeds to block 594. At block 594, the first IoT device is allowed to connect to the IoT hub. The process then moves to a return block, where other processing is resumed. If, instead the determination at decision block 593 is negative, the process advances to block 595. At block 595, the first IoT device is not allowed to connect to the IoT hub. The process then proceeds to a return block, where other processing is resumed. In this way, the first IoT device is selectively allowed to connect to the IoT hub based on the first determination.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for Internet of Things (IoT) authentication, comprising:
an IoT hub including one or more devices, the devices including at least one memory adapted to store run-time data for the devices, and at least one processor that is adapted to execute processor-executable code that, in response to execution, enables the IoT hub to perform actions, including:
storing a plurality of data field targets for a first IoT device, wherein the plurality of data field targets includes at least one device identity data field target and at least one telemetry data field target;
receiving a first plurality of data field entries from the first IoT device at a first time, wherein the first plurality of data field entries includes at least one device identity data field entry and at least one telemetry data field entry, wherein the at least one telemetry data field entries include aggregated telemetry data that includes a plurality of telemetry data field entries from the first IoT device, and wherein the aggregated telemetry data includes at least two telemetry data field entries associated with at least two different types of telemetry data;
making a first determination, wherein the first determination is a determination as to whether the at least one device identity data field entry matches a corresponding at least one device identity data field target for the first IoT device and whether the at least two telemetry data field entries of the aggregated telemetry data each match at least one of a corresponding range of values or discrete value of a telemetry data field target for the corresponding telemetry data field entry for the first IoT device; and
selectively allowing the first IoT device to connect to the IoT hub based on the first determination such that the selective allowance is based, in part, on the aggregated telemetry data.

2. The apparatus of claim 1, the actions further including:
receiving a second plurality of data field entries from the first IoT device at a second time, where the second plurality of data field entries includes at least one other device identity data field entry and at least one other telemetry data field entry;
making a second determination, wherein the second determination is a determination as to whether the at least one other device identity data field entry matches a corresponding at least one other device identity data field target for the first IoT device and whether the at least one other telemetry data field entry matches a corresponding at least one other telemetry data field target for the first IoT device; and
selectively allowing the first IoT device to connect to the IoT hub based on the second determination.

3. The apparatus of claim 1, the actions further including:
reconfiguring the plurality of data field targets for the first IoT device.

4. The apparatus of claim 1, wherein at least one of the at least one device identity data field target is at least one of a serial number target, a user-defined device identity target, a hardware-centric device identity target, an identity target based on a measurement of a quantity associated with the first IoT device, a system-generated device identity target, or an auto-generated device identity target.

5. The apparatus of claim 1, wherein at least one of the at least one telemetry data fields targets include at least one of a temperature target, a humidity target, a location target, a light target, a heart rate target, or a breathing rate target.

6. The apparatus of claim 1, wherein at least one of the data field targets of the plurality of data fields targets include at least one of a discrete target value or a range of target values.

7. The apparatus of claim 1, wherein at least one of the data field targets of the plurality of data field targets is at least partially conditional upon time of day.

8. A method for Internet of Things (IoT) authentication, comprising:
receiving a plurality of data field targets for a first IoT device;
receiving a first plurality of data field entries from the first IoT device at a first time, wherein the first plurality of data field entries include aggregated telemetry data that includes a plurality of telemetry data field entries from the first IoT device, and wherein the aggregated telemetry data includes at least two telemetry data field entries associated with at least two different types of telemetry data;

making a first determination, wherein the first determination is a determination as to whether the first plurality of data field entries match corresponding data field targets for the first IoT device, including:

determining whether a device identity data field entry of the first plurality of data field entries matches a corresponding device identity data field target of the plurality of data field targets for the first IoT device; and determining whether the at lest two telemetry data field entries of the aggregated telemetry data each match at least one of a corresponding range of values or discrete value of a telemetry data field target of the plurality of data field targets for the corresponding telemetry data field entry for the first IoT device; and selectively allowing the first IoT device to connect to the IoT hub based on the first determination such that the selective allowance is based, in part, on the aggregated telemetry data.

9. The method of claim 8, further comprising:

receiving a second plurality of data field entries from the first IoT device at a second time;

making a second determination, wherein the second determination is a determination as to whether the second plurality of data field entries match the corresponding data field targets for the first IoT device; and selectively allowing the first IoT device to connect to the IoT hub based on the second determination.

10. The method of claim 8, further comprising:

reconfiguring the plurality of data field targets for the first IoT device.

11. The method of claim 8, wherein the plurality of data field targets includes at least one device identity data field target, and wherein at least one of the at least one device identity data field target includes at least one of a serial number target, a user-defined device identity target, a hardware-centric device identity target, an identity target based on a measurement of a quantity associated with the first IoT device, a system-generated device identity target, or an auto-generated device identity target.

12. The method of claim 8, wherein the plurality of data field targets includes at least one telemetry data field target, and wherein at least one of the at least one telemetry data field target includes at least one of a temperature target, a humidity target, a location target, a light target, a heart rate target, or a breathing rate target.

13. The method of claim 8, wherein the data field targets of the plurality of data fields targets include at least one of a discrete target value or a range of target values.

14. The method of claim 8, wherein at least one of the data field targets of the plurality of data field targets is at least partially conditional upon time of day.

15. A processor-readable storage medium, having stored thereon processor-executable code, that, upon execution by at least one processor, enables actions, comprising:

receiving data field entries from a device, wherein the data field entries include at least a first device identity data field entry and at least a first telemetry data field entry, wherein the first plurality of data field entries include aggregated telemetry data that includes a plurality of telemetry data field entries from the first IoT device, and wherein the aggregated telemetry data includes at least two telemetry data field entries associated with at least two different types of telemetry data;

determining whether the data field entries match corresponding data field targets for the first IoT device, including:

determining whether the first device identity data field entry matches a corresponding device identity data field target; and determining whether the at lest two telemetry data field entries of the aggregated telemetry data each match at least one of a range of values or discrete value for a corresponding telemetry data field target; and selectively connecting the device to the IoT hub based on the determination such that the selective connection is based, in part, on the aggregated telemetry data.

16. The processor-readable storage medium of claim 15, the actions further comprising:

subsequent to receiving the data field entries, receiving additional data field entries from the device, where the additional of data field entries include at least one device identity data field entry and at least one telemetry data field entry;

making another determination, wherein said another determination is a determination as to whether the additional data field entries match the corresponding data field targets for the device; and selectively allowing the IoT device to connect to the IoT hub based on said another determination.

17. The processor-readable storage medium of claim 15, the actions further comprising:

reconfiguring the corresponding data field targets for the device.

18. The processor-readable storage medium of claim 15, wherein the corresponding device identity data field target is at least one of a serial number target, a user-defined device identity target, a hardware-centric device identity target, an identity target based on a measurement of a quantity associated with the device, a system-generated device identity target, or an auto-generated device identity target.

19. The processor-readable storage medium of claim 15, wherein the corresponding telemetry data field target includes at least one of a temperature target, a humidity target, a location target, a light target, a heart rate target, or a breathing rate target.

20. The processor-readable storage medium of claim 15, wherein at least one of the corresponding data field targets is at least partially conditional upon time of day.

* * * * *